US008428872B2

(12) United States Patent
Clark et al.

(10) Patent No.: US 8,428,872 B2
(45) Date of Patent: Apr. 23, 2013

(54) SYSTEM AND METHOD FOR ENTRY OF TAXI ROUTE ON CONTROL DISPLAY UNIT

(75) Inventors: Samuel T. Clark, Federal Way, WA (US); Robert P. Smith, Clinton, WA (US); Roglenda R. Bowe, Maple Valley, WA (US); Andrew D. Neff, Kent, WA (US)

(73) Assignee: The Boeing Company, Chicago, IL (US)

(*) Notice: Subject to any disclaimer, the term of this patent is extended or adjusted under 35 U.S.C. 154(b) by 991 days.

(21) Appl. No.: 11/954,387

(22) Filed: Dec. 12, 2007

(65) Prior Publication Data

US 2009/0157300 A1 Jun. 18, 2009

(51) Int. Cl.
*G01C 21/00* (2006.01)
*G01C 21/34* (2006.01)
*G08G 1/123* (2006.01)

(52) U.S. Cl.
USPC ............... 701/432; 701/3; 701/418; 701/430; 701/431; 701/538; 345/168; 345/173; 345/179

(58) Field of Classification Search .................. 701/201, 701/3, 400, 409, 418, 430, 432, 461, 487, 701/538, 540; 345/104, 179, 180, 182, 183; 382/189, 214
See application file for complete search history.

(56) References Cited

U.S. PATENT DOCUMENTS 3,706,969 A * 12/1972 Paredes ......................... 340/989
4,604,711 A 8/1986 Benn et al.
5,475,594 A 12/1995 Oder et al.
6,389,355 B1 5/2002 Gibbs et al.
6,573,914 B1 * 6/2003 Pauly et al. .................. 715/769
6,731,226 B2 * 5/2004 Walter .......................... 340/972
6,751,545 B2 * 6/2004 Walter .......................... 701/120
6,789,010 B2 * 9/2004 Walter .......................... 701/120
7,222,017 B2 5/2007 Clark et al.
7,343,229 B1 * 3/2008 Wilson ............................ 701/15
7,441,183 B2 * 10/2008 Burstrom et al. ............. 715/230
(Continued)

FOREIGN PATENT DOCUMENTS

WO WO 03/071228 A2 8/2003
WO WO2006/085749 A1 8/2006

OTHER PUBLICATIONS

International Search Report for Application No. GB0822030.3 dated Mar. 13, 2009, 3 pages.

*Primary Examiner* — Thomas Tarcza
*Assistant Examiner* — Rami Khatib
(74) *Attorney, Agent, or Firm* — Klintworth & Rozenblat IP LLC

(57) ABSTRACT

A system and method is provided for receiving and displaying a taxiway navigation route on a control display unit having at least one entry field and a plurality of display lines. A plurality of taxi route segments are received from an entry field. The plurality of taxi route segments include at least a first taxi route segment and a second taxi route segment. The taxi route segments are assigned to separate display lines in the order in which the taxi route segments were received to form a taxiway navigation route. The taxi route segments are displayed on the control display unit in the order in which the taxi route segments were received. The display line in which the first taxi route segment is to be assigned can be selected. In addition, navigation data corresponding to the taxi route segments can be identified, retrieved, and assigned to the respective taxi route segment.

16 Claims, 9 Drawing Sheets

U.S. PATENT DOCUMENTS

| | | | | |
|---|---|---|---|---|
| 7,567,187 | B2 * | 7/2009 | Ramaiah et al. | 340/945 |
| 7,587,278 | B2 * | 9/2009 | Poe et al. | 701/301 |
| 7,844,392 | B2 * | 11/2010 | Dubourg | 701/120 |
| 2003/0105579 | A1 * | 6/2003 | Walter | 701/120 |
| 2004/0006412 | A1 * | 1/2004 | Doose et al. | 701/10 |
| 2004/0054550 | A1 * | 3/2004 | Cole et al. | 705/1 |
| 2005/0090969 | A1 * | 4/2005 | Siok et al. | 701/120 |
| 2007/0241936 | A1 * | 10/2007 | Arthur et al. | 340/958 |
| 2007/0299597 | A1 * | 12/2007 | Fetzmann et al. | 701/120 |
| 2008/0143557 | A1 * | 6/2008 | Smith | 340/958 |

* cited by examiner

SYSTEM AND METHOD FOR ENTRY OF TAXI ROUTE ON CONTROL DISPLAY UNIT

FIELD OF THE INVENTION

The present invention relates generally to computer-based systems used in the navigation of aircraft.

BACKGROUND OF THE INVENTION

The Flight Deck Control Display Unit ("CDU") is an interface system that allows a pilot to monitor and control various other aircraft systems. The CDU is the primary interface for the aircraft's Flight Management System ("FMS"), thereby making the CDU the primary system used to enter and display the navigation route for flight. However, the CDU is generally not used to enter and display the ground navigation route for taxiing of aircraft because the surface traffic movement does not lend itself to predefined or 'stored' taxi routes, taxi route datalink capability does not currently exist, and the manual entry and display of taxi route navigation on the CDU currently requires many user inputs and is, therefore, inefficient and error prone. Conventional solutions to this problem have been to develop systems that are completely separate from the CDU. Separate systems are problematic for several reasons, including because they require the pilot to learn how to use such systems, take up valuable space and add complexity in an already crowed and complex flight deck, and federate aircraft navigation interface and display into separate locations and methods. It is desirable to provide a common system and method of aircraft navigation interface and display that utilizes the CDU to integrate taxi and flight routes, is efficient, and less error prone.

SUMMARY

A method is provided for receiving and displaying a taxiway navigation route on a control display unit having at least one entry field and a plurality of display lines. A plurality of taxi route segments are received from an entry field. The plurality of taxi rout segments include at least a first taxi route segment and a second taxi route segment. The taxi route segments are assigned to separate display lines in the order in which the taxi route segments were received to form a taxiway navigation route. At least the first taxi route segment is assigned to a first display line and a second taxi route segment is assigned to a second display line. The taxi route segments are displayed on the control display unit in the order in which the taxi route segments were received. At least the first taxi route segment is displayed on the first display line and the second taxi route segment is displayed on the second display line. The display line in which the first taxi route segment is to be assigned can be selected. In addition, navigation data corresponding to the taxi route segments can be identified, retrieved, and assigned to the respective taxi route segment. At least the navigation data corresponding to the first taxi route segment can be displayed adjacent to the first taxi route segment and the navigation data corresponding to the second taxi route segment can be displayed adjacent to the second taxi route segment.

A system is also provided for displaying a taxiway navigation route on a control display unit. A control display unit that can display data, receive user inputs, and has at least one entry field and a plurality of display lines is adapted so the user can input in the entry field at least a plurality of taxi route segments. The plurality of taxi route segments can be at least a first taxi route segment and a second taxi route segment. A processor in communication with the control display unit is adapted to assign the plurality of taxi route segments to separate display lines in the order in which the taxi route segments were inputted to form a taxiway navigation route. At least the first taxi route segment can be assigned to a first display line and the second taxi route segment is assigned to a second display line. The processor can be further adapted to display the taxi route segments on the control display unit in the plurality of display lines in the order in which the taxi route segments were inputted. At least the first taxi route segment can be displayed in the first display line and the second taxi route segment is displayed in the second display line. The processor can be adapted to allow a user to select the display line in which the first taxi route segment is displayed. In addition, a navigation data system can be in communication with the processor. The processor can be adapted to identify and retrieve navigation data stored in the navigation data system which corresponds to the taxi route segments and assign the navigation data to the corresponding taxi route segments so that at least the navigation data corresponding to the first taxi route segment is assigned to the first taxi route segment and the navigation data corresponding to the second taxi route segment is assigned to the second taxi route segment. The processor can be further adapted to display the navigation data corresponding to the taxi route segments on the control display unit. At least the navigation data corresponding to the first taxi route segment can be displayed adjacent to the first taxi route segment and the navigation data corresponding to the second taxi route segment can be displayed adjacent to the second taxi route segment.

The features, functions, and advantages that have been discussed can be achieved independently in various embodiments of the present invention or may be combined in yet other embodiments further details of which can be seen with reference to the following description and drawings.

DETAILED DESCRIPTION

A system and method for receiving and displaying a taxi route on a Flight Deck Control Display Unit ("CDU") of commercial aircraft is provided. The system allows the pilot to enter and display a taxi route on the CDU in an efficient way. This reduces the potential for pilot error and the need for separate systems in the flight deck that are dedicated to the display of taxi route information, which thereby reduces the training required for pilots who must use such separate systems. In addition, because the CDU is the main interface with the Flight Management System ("FMS") of the aircraft, it is beneficial to have taxi route and flight route navigation information that is entered, displayed, and controlled on the CDU.

Figure 1:
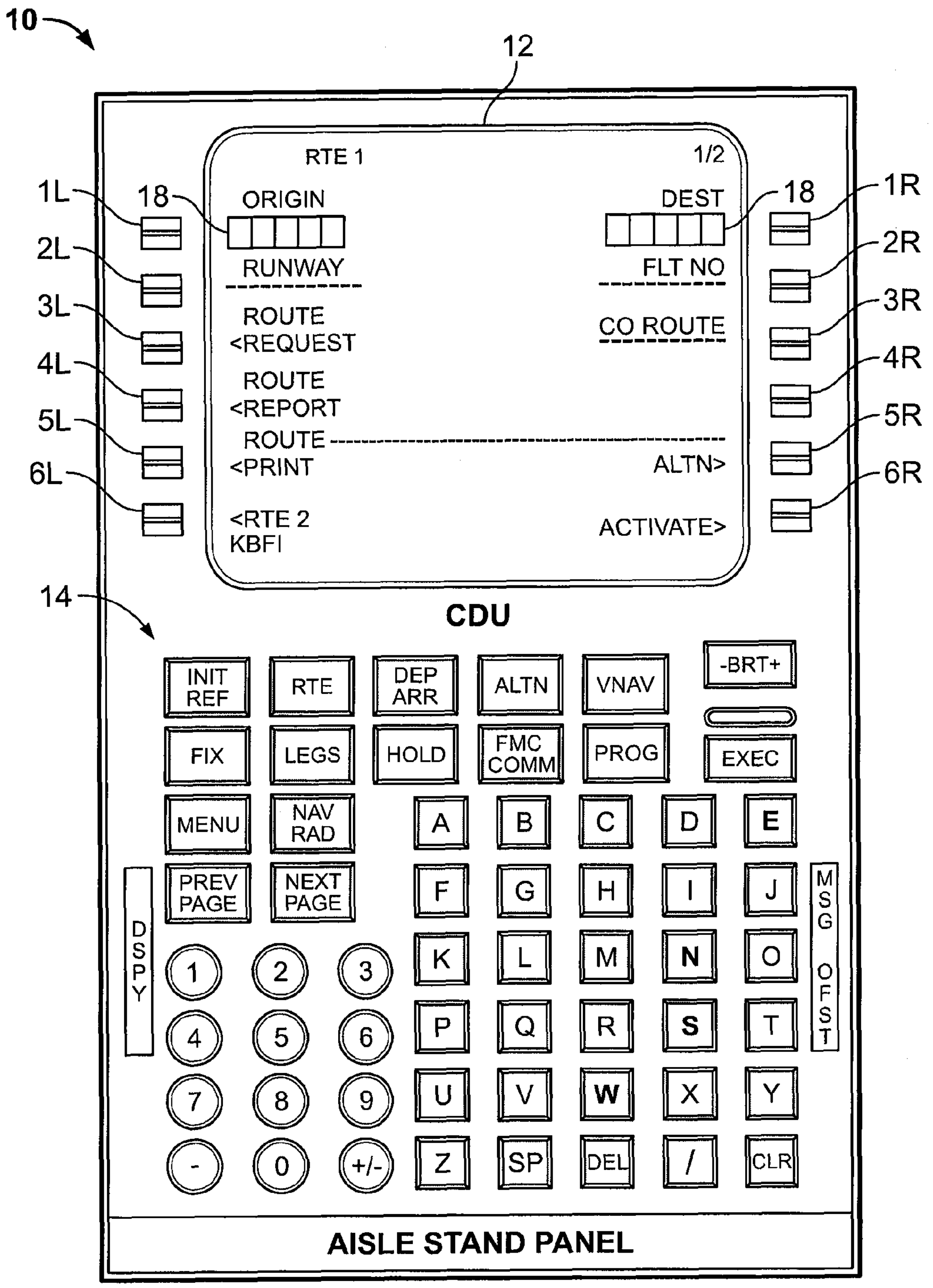
FIG. 1 is a drawing of a conventional CDU for a commercial aircraft.
Figure 2:
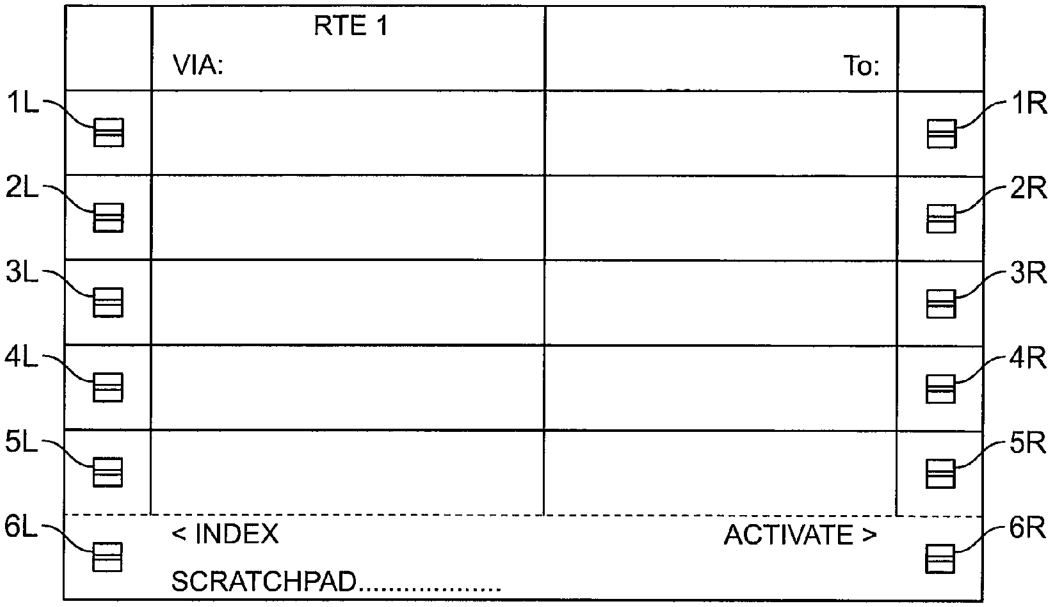
FIG. 2 is a drawing of a CDU display screen with an entry field, a plurality of display lines, and corresponding display line select keys.

Referring to FIG. 1, a drawing of a conventional CDU 10 for commercial aircraft is shown. The CDU has a display 12 and a keypad 14. Keypad 14 includes CDU page keys, alphanumeric entry keys, and various CDU display function keys. Display 12 can have at least one entry field, a plurality of display lines, and a plurality of display line select keys corresponding to display lines. The conventional CDU includes twelve display lines and display line select keys, six on the left and six on the right, and are commonly referred to as 1L through 6L for the display lines and display line select keys on the left side of the CDU display screen and 1R through 6R for the display lines and display line select keys on the right side of the CDU display screen. The entry field for conventional CDU is below display line 6L and is commonly referred to as the SCRATCHPAD. A drawing of display 12 with cleared display lines and entry field, labeled SCRATCHPAD, is shown in FIG. 2. To aid the description of the drawings showing examples of display 12, the display lines corresponding to their respective display line select keys 1L through 6L and 1R through 6R are delineated in table form. For example, referring to FIG. 2, the box to the right of display line select key 1L will be referred to as display line 1L and the box to the left of display line select key 1R will be referred to as display line 1R.

Figure 3A:
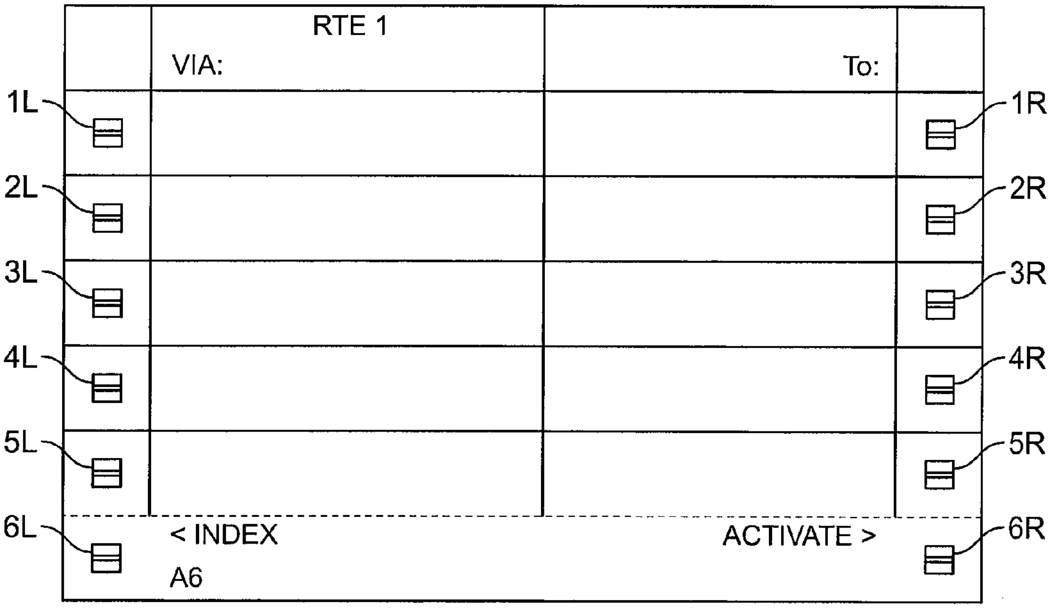
FIGS. 3A through 3D are a series of drawings of CDU display screens that show how a taxi route is entered and displayed on a CDU according to a conventional method.
Figure 3B:
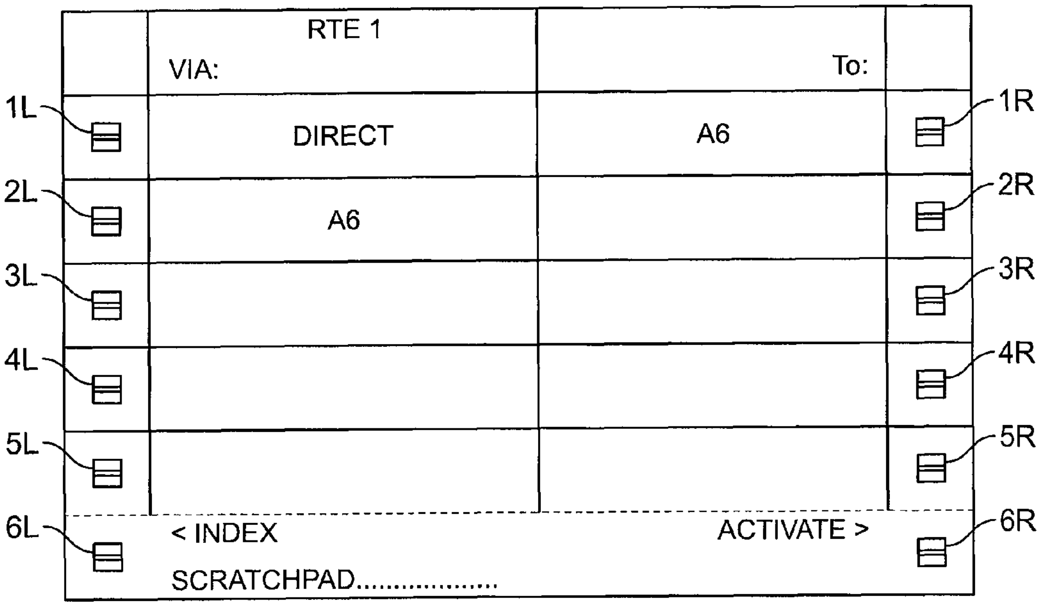
Figure 3C:
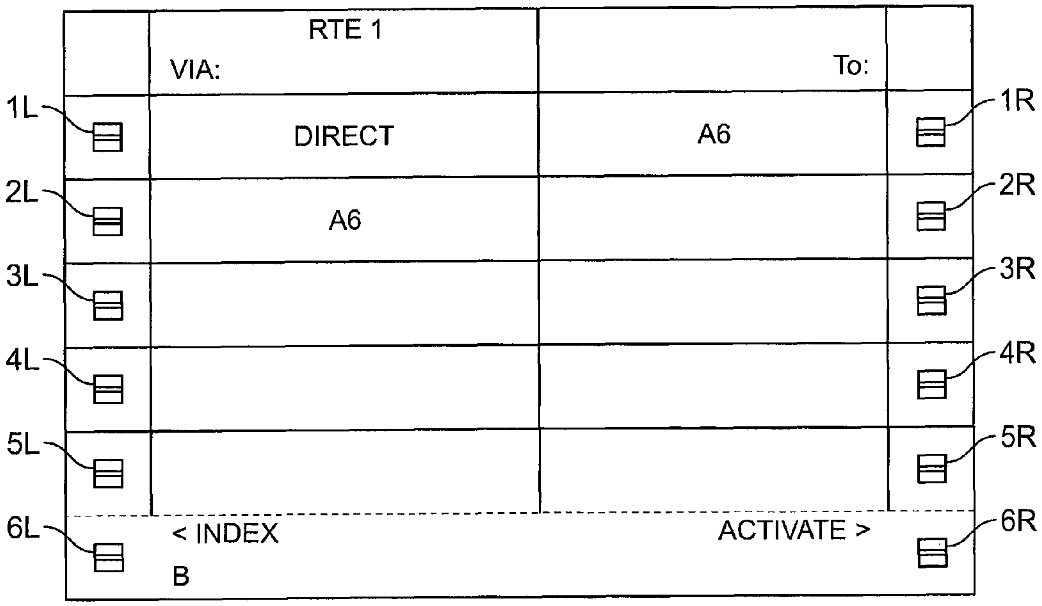
Figure 3D:
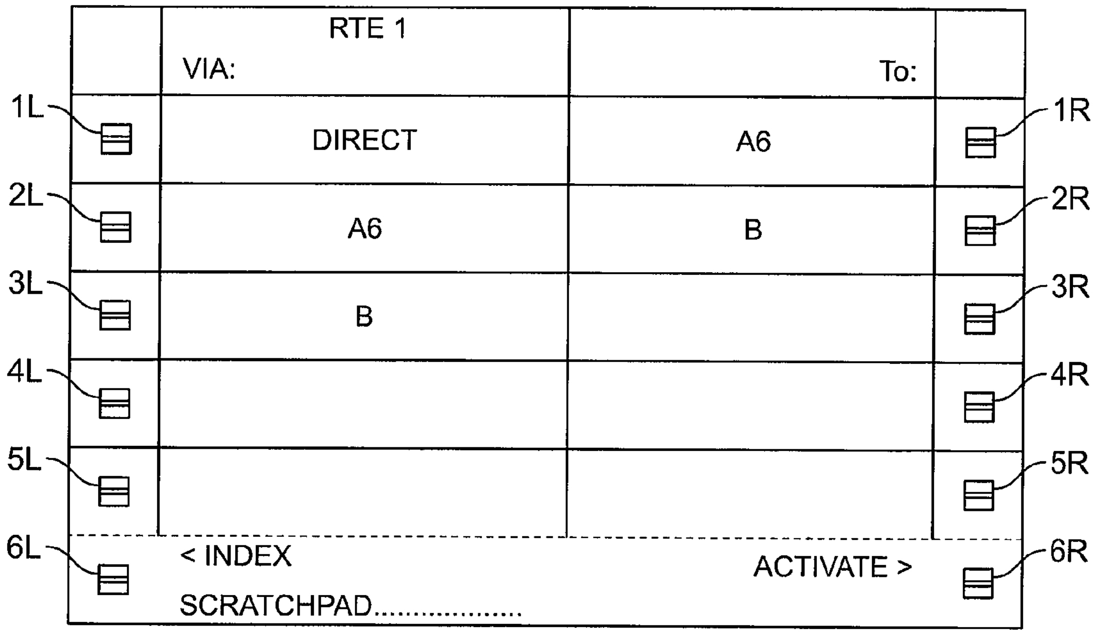

The conventional method of entering and displaying taxi route information on the CDU requires multiple inputs by the pilot. Referring to FIG. 3A, the pilot must first, enter a first taxi route segment into the SCRATCHPAD entry field using the keypad, which in this example is taxi route segment A6, and second, press one of the display line select keys in which the first taxi route segment is to be displayed. For example, referring to FIG. 3B, if the pilot pressed display line select key 1R, the system would display taxi route segment A6 in display line 1R. In addition, the system would display DIRECT in display line 1L and taxi route segment A6 in display line 2L to show that the aircraft must move from its current position, which is represented by the term DIRECT, to taxi route segment A6 in order to reach segment A6 in the taxi route. To continue to enter the taxi route, the pilot must enter a second taxi route segment into the SCRATCHPAD entry field using the keypad and press the display line select key in which the second taxi route segment is to be displayed. For example, referring to FIG. 3C, if the assigned taxi route is to have taxi route segment B follow taxi route segment A6, the pilot would enter B into the SCRATCHPAD entry field using the keypad. Then, referring to FIG. 3D, press display line select key 3L to display taxi route segment B in display line 3L. In addition, the system would display taxi route segment B in display line 2R to show that the aircraft must move via taxi route segment A6 to taxi route segment B to move along the taxi route. For the conventional method and system, this order of entries must be repeated to enter a series of taxi route segments to display a taxiway navigation route on the CDU.

Figure 4:
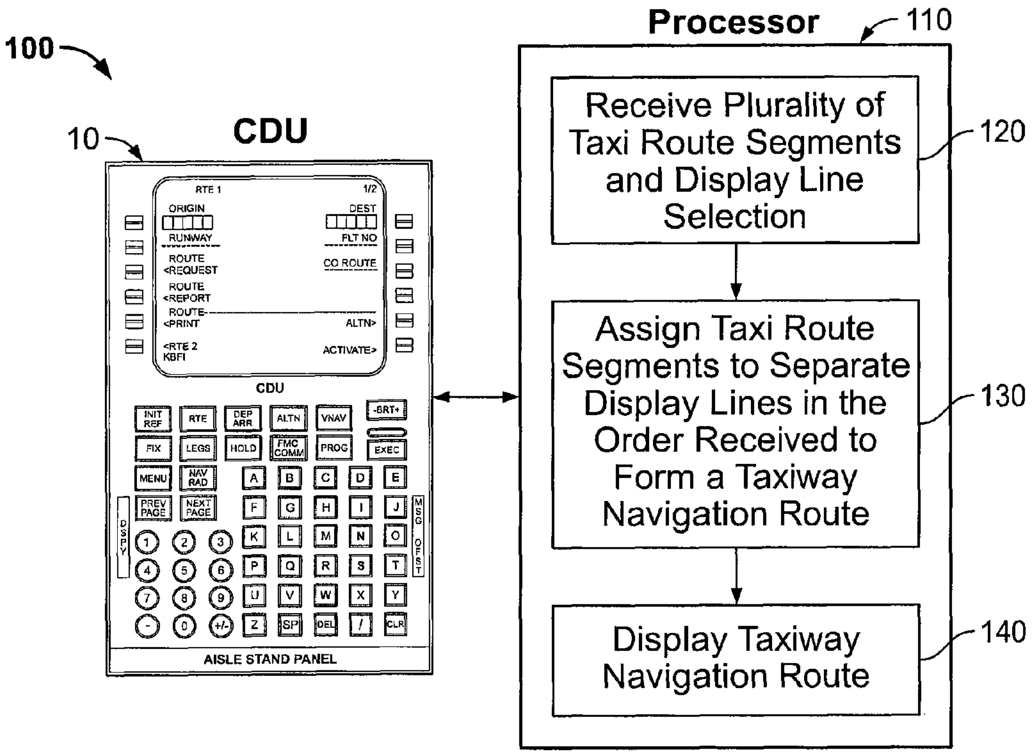
FIG. 4 is a flow diagram illustrating operation of one example of a system and method for receiving and displaying a taxi route on a CDU.

The method and system disclosed herein, on the other hand, allows the pilot to enter a plurality of taxi route segments into the SCRATCHPAD entry field and display a taxiway navigation route with a single display line selection, thereby using a significantly less number of inputs. Referring to FIG. 4, an example illustration of the operation of system 100 is provided. System 100 running on processor 110 in this example is in the form of a software program used to display a taxiway navigation route on a conventional CDU 10. In step 120, a plurality of taxi route segment entries and a display line selection are received from CDU 10. The plurality of taxi route segments can be input into the entry field by several methods of entry, including but not limited to manual keypad entry, manual touchscreen entry, verbal entry, datalink entry, and stored and recall entry. In addition, a delimiter can be input after each taxi route segment to signal that a discrete taxi route segment has been entered. The delimiters can be a space entry, a period, a dash or other symbols, characters, or numbers. The system can also be adapted to recognize taxi route segments and automatically insert delimiters upon entry of the discrete taxi route segment. In step 130, the taxi route segment are assigned to separate display lines in the order in which the taxi route segments were received to form a taxiway navigation route. In step 140, the taxiway navigation route is displayed on CDU 10. One example of the operation of the system and method is described below in further detail with reference to FIGS. 5A and 5B.

Figure 5A:
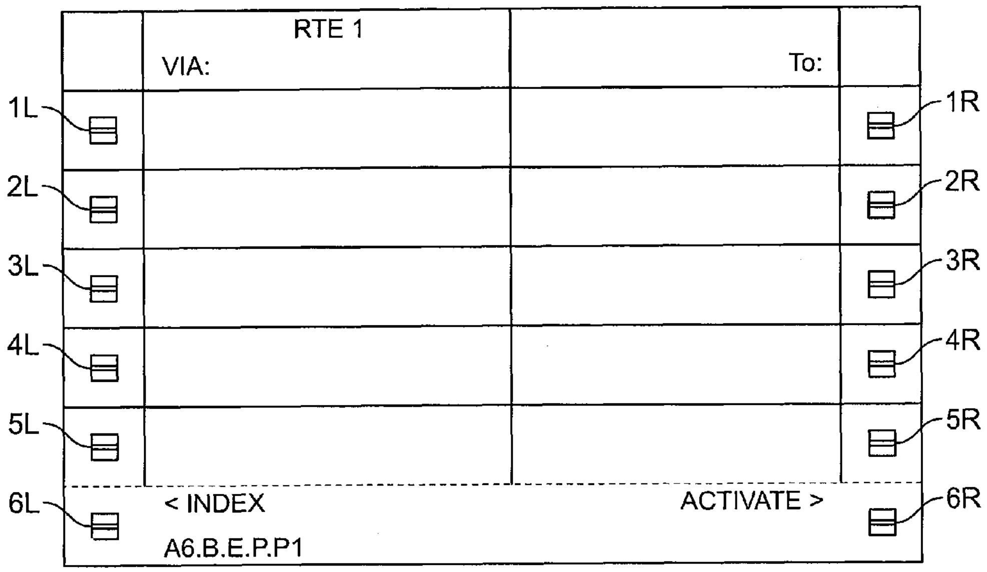
FIGS. 5A and 5B are a pair of drawings of CDU display screens that show how a taxi route is entered and displayed according to one example of the method disclosed herein.
Figure 5B:
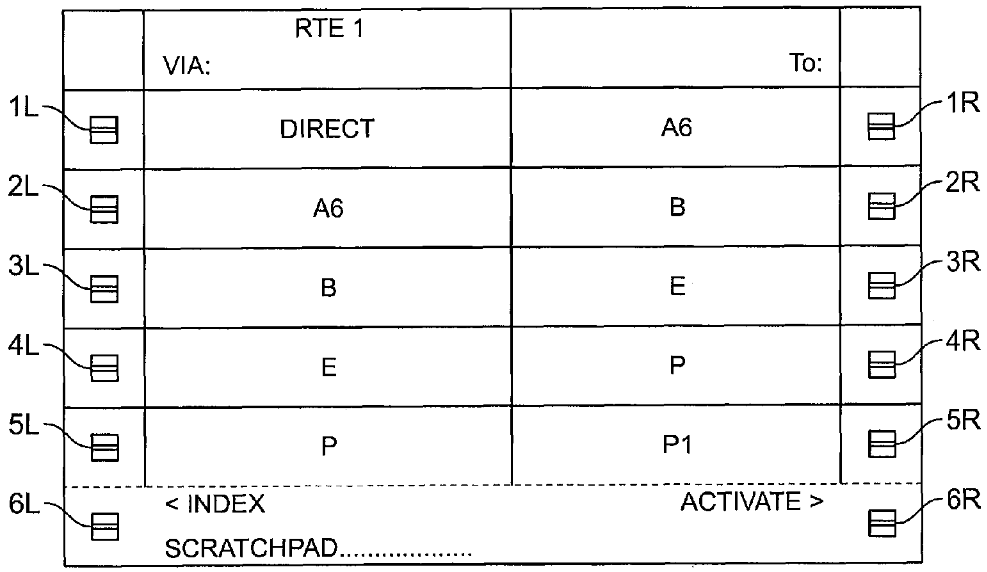

Referring to FIG. 5A, the pilot could: first, using the keypad, enter a first taxi route segment, which in this example is taxi route segment A6, followed by a second taxi route segment, B, a third taxi route segment, E, a forth taxi route segment, P, and a fifth taxi route segment, P1. As each segment is keyed, it is displayed in the SCRATCHPAD entry field. Then, second, the pilot presses one of the display line select keys to select which display line the first taxi route segment is to be displayed. The system would then automatically assign the taxi route segments to separate display lines in the order in which the taxi route segments were entered. FIG. 5B shows where the system would assign and display the plurality of taxi route segments entered in FIG. 5A to separate display lines in the order the taxi route segments were entered.

Therefore, a pilot can enter a plurality of taxi route segments into the SCRATCHPAD entry field and assign and display the taxiway navigation route in nearly half of the inputs required with the conventional method. For example, to enter and display a taxiway navigation route of five taxi route segments using the conventional method, the pilot would have to make at least eleven inputs. Using the method disclosed herein, however, entering the same taxiway navigation route of five taxi route segments would only require at seven inputs. In addition, the number of times the pilot must reach from the keyboard to a line select key and locate a specific line select key is reduced from five to only once. The reduction in number of inputs and number reaches from the keyboard to a line select key is significant. Pilot workload, time, and opportunity for error are all reduced. The net result is an increase in interface efficiency and accuracy.

Figure 6A:
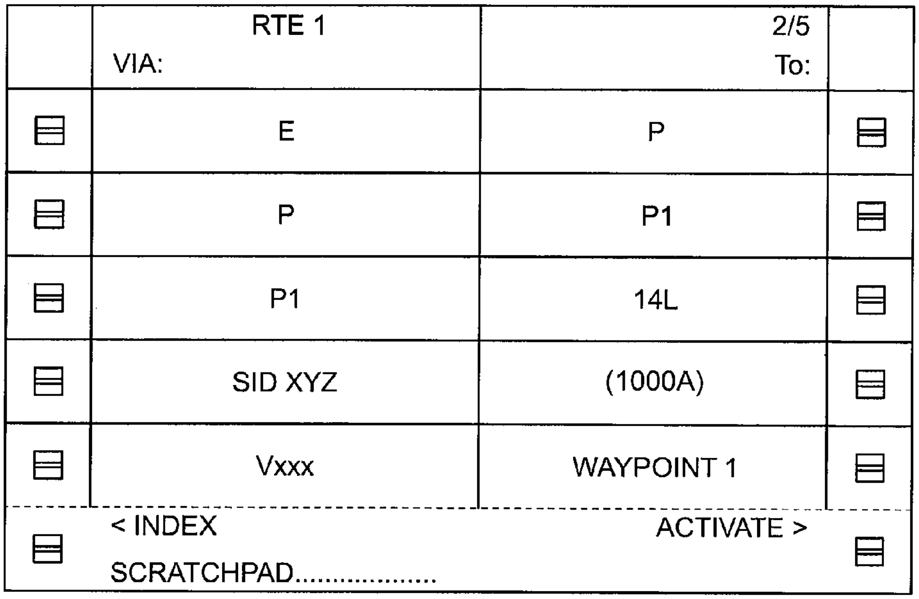
FIGS. 6A and 6B are drawings of CDU display screens that show a taxi-out route and a taxi-in route appended to a flight navigation route.
Figure 6B:
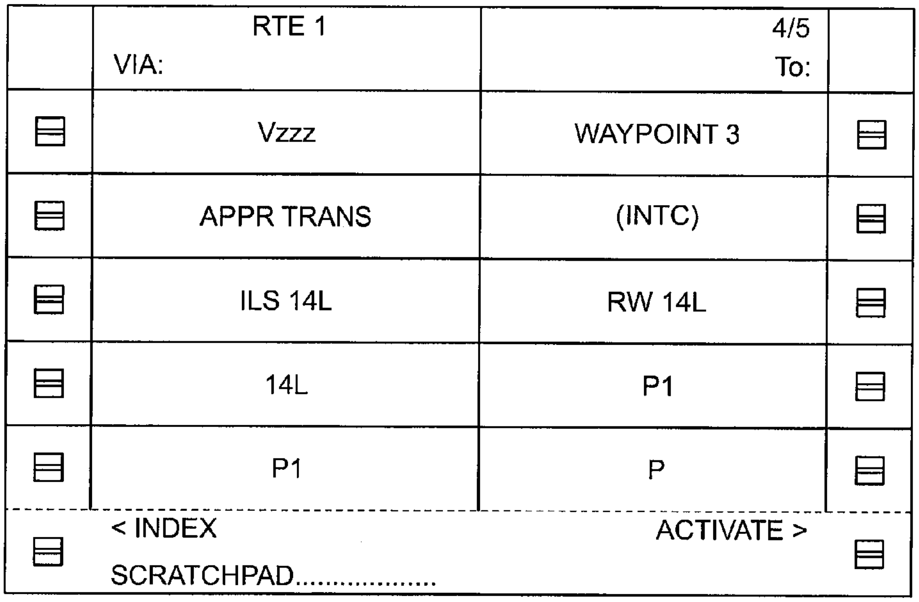

In addition, referring to FIGS. 6A and 6B, the taxiway navigation route can be appended to a taxi-out navigation route and a taxi-in navigation route. FIG. 6A shows one example of a taxi-out navigation route where taxi route segments E, P, and P1 lead to runway 14L. The flight navigation route begins after runway 14L with Standard Instrument Departure XYZ (SID) and vector airway segment Vxxx to WAYPOINT1. FIG. 6B shows one example of a taxi-in navigation route where the flight navigation route is via vector airway Vzzz to WAYPOINT3 and the approach vector, via APPR TRANS to intercept ILS 14L, and via ILS 14L to runway 14L. A missed approach route (not shown) may or may not be displayed. The taxi-in navigation route begins after the flight navigation route ends with runway 14L leading to taxi route segments P1 and P.

Figure 7:
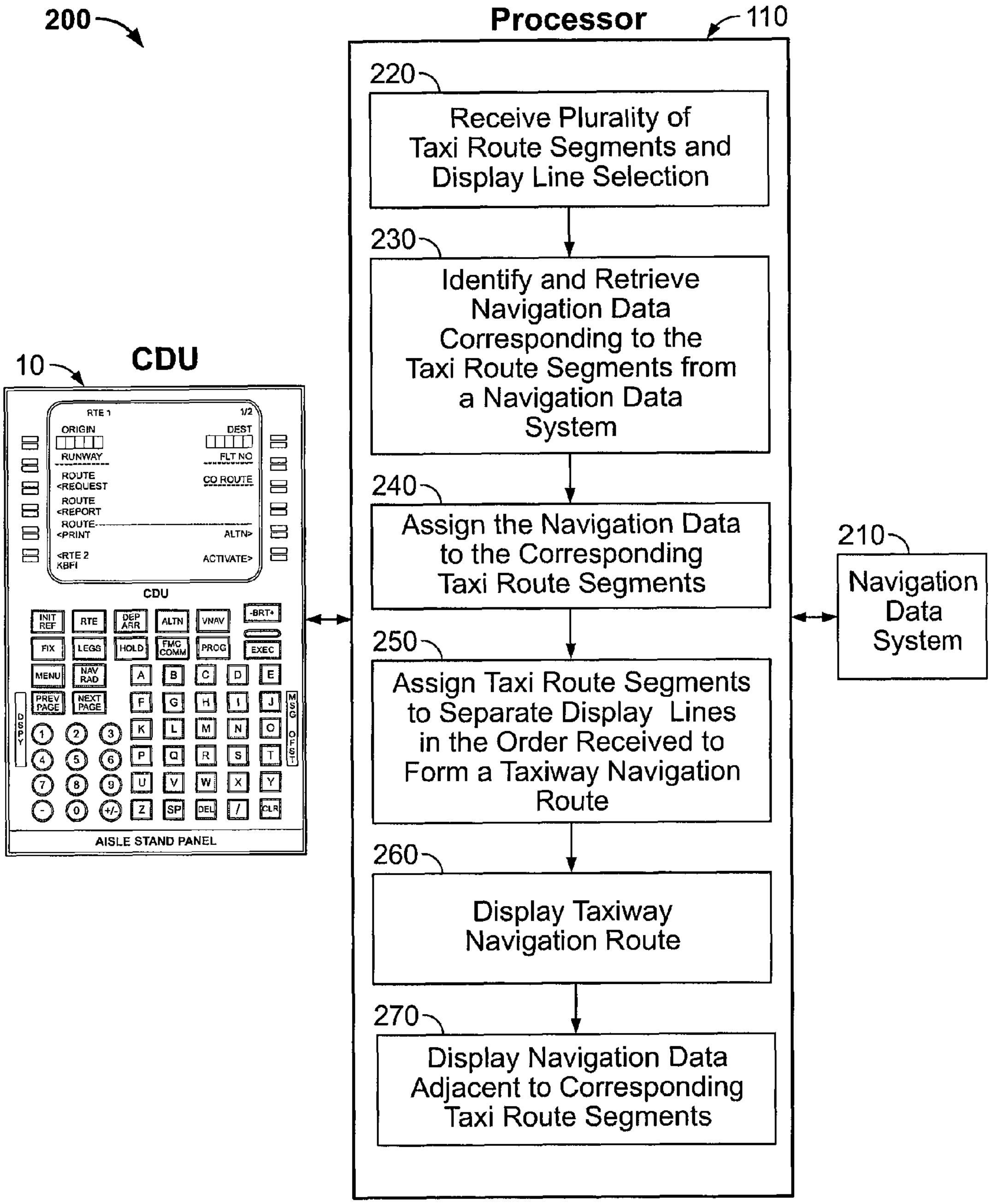
FIG. 7 is a flow diagram illustrating operation of one example of a system and method for receiving and displaying a taxi route on a CDU.
Figure 8:
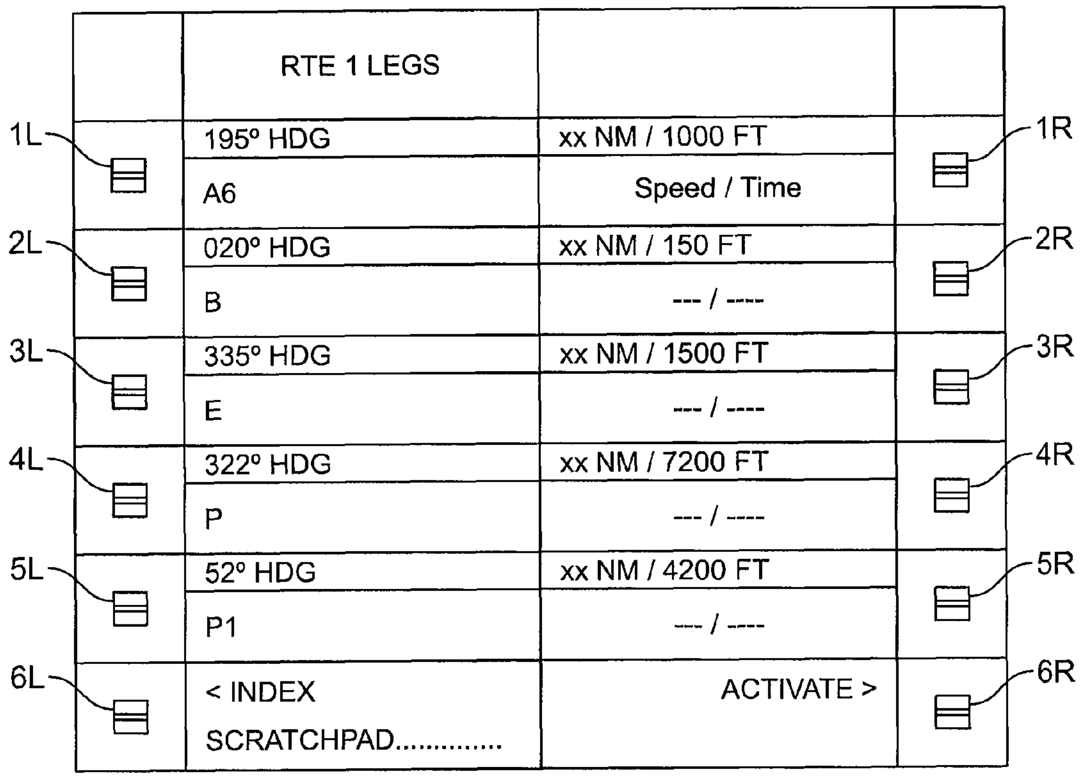
FIG. 8 is a drawing of a CDU display screen that shows a taxi route with navigation data displayed adjacent to corresponding taxi route segments.

In another example, the system can display navigation data corresponding to the taxi route segments. Referring to FIG. 7, an example illustration of the operation of system 200 running on processor 110 is provided. System 200 running on processor 110 in this example is in the form of a software program used to display a taxiway navigation route with navigation data on a conventional CDU 10. Processor 110 is in communication with CDU 10 and Navigation Data System 210. Navigation Data System 210 can be one or several systems that measure, calculate, receive, or store navigation related data. For example, Navigation Data System 210 can be an Airport Moving Map application (AMM), a Global Positioning System (GPS), the aircraft's own avionic devices, and all or more of these and related devices and databases. In step 220, a plurality of taxi route segment entries and a display line selection are received from CDU 10. In step 230, navigation data corresponding to the taxi route segments is identified and retrieved from Navigation Data System 210. Navigation data can include, for example, the geographic location of points on a taxi route segment, a taxi route segment heading, a length of the taxi route segment, a distance to an end of the taxi route segment, a time remaining until an end of the taxi route segment is reached, and a speed limit or other limitations. Navigation data can also include a navigation instruction which can, for example, instruct the pilot on what action to take on or at the end of a taxi route segment (e.g., stop, hold, cross, turn left, turn right, etc.). In step 240, the navigation data is assigned to the corresponding individual taxi route segments. For example, navigation data corresponding to a first taxi route segment is assigned to the first taxi route segment and navigation data corresponding to a second taxi route segment is assigned to the second taxi route segment. In step 250, the taxi route segments are assigned to separate display lines in the order in which the taxi route segments were received to form a taxiway navigation route. In step 260, the taxiway navigation route is displayed on CDU 10. In step 270, the navigation data is displayed adjacent to its corresponding taxi route segment. For example, navigation data corresponding to the first taxi route segment is displayed adjacent to the first taxi route segment and the navigation data corresponding to the second taxi route segment is displayed adjacent to the second taxi route segment and so on. Display of navigation data adjacent to a taxi route segment can include, for example, displaying navigation data in or above the same display field as the taxi route segments or in the display field to the right of the taxi route segment. For example, referring to FIG. 8, one way the system can display a taxiway navigation route with corresponding navigation data is to display the taxi route segments along the left display lines with navigation data corresponding to the taxi route segments displayed in, above, or below the respective display lines and in the display lines to the right of the taxi route segment. In the example in FIG. 8, a taxi route segment heading corresponding to taxi route segment A6 is displayed in the same display line, display line 1L, as taxi route segment A6. In addition, a length of taxi route segment A6, aircraft speed, and time until an end of the taxi route segment is reached can be displayed to the right in display line 1R.

The foregoing description of the preferred embodiments of the invention have been presented for purposes of illustration and description, and are not intended to be exhaustive or to limit the invention the precise forms disclosed. The descriptions were selected to best explain the principles of the invention and their practical application to enable others skilled in the art to best utilize the invention in various embodiments and various modifications as are suited to the particular use contemplated. It is intended that the scope of the invention not be limited by the specification, but be defined by the claims set forth below.

What is claimed is:

1. A method of receiving and displaying a taxiway navigation route on a control display unit comprising a scratchpad and a plurality of display lines, the method comprising:

entering a plurality of taxi route segments into a scratchpad so that the plurality of taxi route segments are all simultaneously displayed in the scratchpad, wherein the plurality of taxi route segments comprises at least a first taxi route segment and a second taxi route segment;

then selecting a single display line select key to select a first display line associated with the single display line select key;

after selecting the single display line select key, automatically assigning the taxi route segments to separate display lines in the order in which the taxi route segments were received to form a taxiway navigation route, wherein the first taxi route segment is automatically assigned to the first display line, and the second taxi route segment is automatically assigned to a second display line; and after assigning the taxi route segments to separate display lines, automatically displaying the taxi route segments on the control display unit in the order in which the taxi route segments were received, wherein the first taxi route segment is automatically displayed on the first display line, and the second taxi route segment is automatically displayed on the second display line.

2. The method of claim 1 wherein the taxi route segments comprise at least one of a taxi-out navigation route or a taxi-in navigation route.

3. The method of claim 2 further comprising appending a flight navigation route to at least one of the taxi-out navigation route or the taxi-in navigation route.

4. The method of claim 1 wherein the entering the plurality of the taxi route segments into the scratchpad comprises inputting the plurality of the taxi route segments into the scratchpad using manual keypad entry, touchscreen entry, verbal entry, datalink entry, or stored and recall entry.

5. The method of claim 4 further comprising inputting delimiters between the plurality of taxi route segments.

6. The method of claim 5 wherein the delimiters are input automatically.

7. The method of claim 1 further comprising automatically displaying corresponding navigation data, comprising at least one of a taxi route segment heading, a taxi route segment length, a distance to an end of the taxi route segment, a time remaining until an end of the taxi route segment is reached, or a speed limit, adjacent to each of the respective first and second taxi route segments.

8. The method of claim 1 further comprising providing at least one navigation instruction which instructs a user as to what action to take during or at an end of at least one of the taxi route segments.

9. A system for receiving and displaying a taxiway navigation route on a control display unit, the system comprising:

a control display unit adapted to display data and receive user inputs comprising a scratchpad and a plurality of display lines, wherein the user can input into the scratchpad a plurality of taxi route segments comprising at least a first taxi route segment and a second taxi route segment so that the plurality of taxi route segments are all simultaneously displayed in the scratchpad;

a display line select key for selecting the first display line after the plurality of display lines are inputted into the scratchpad;

a processor in communication with the control display unit, wherein the processor is adapted to assign the plurality of taxi route segments to separate display lines in the order in which the taxi route segments were inputted to form a taxiway navigation route, wherein, when the display line select key is selected, the first taxi route segment is automatically assigned to the first display line, and the second taxi route segment is automatically assigned to the second display line; and the processor is adapted to display the taxi route segments on the control display unit in the plurality of display lines in the order in which the taxi route segments were inputted, wherein, when the display line select key is selected, the first taxi route segment is automatically displayed in the first display line, and the second taxi route segment is automatically displayed in the second display line.

10. The system of claim 9 wherein the taxi route segments comprise at least one of a taxi-out navigation route or a taxi-in navigation route.

11. The system of claim 10 wherein the processor is adapted to append a flight navigation route to at least one of the taxi-out navigation route or the taxi-in navigation route.

12. The system of claim 9 wherein the processor is adapted to receive the plurality of taxi route segments by at least one of manual keypad entry, verbal entry, datalink entry, or stored and recall entry.

13. The system of claim 12 wherein the processor is adapted to receive delimiters between the plurality of taxi route segments.

14. The system of claim 13 wherein the processor is adapted to enter the delimiters automatically.

15. The system of claim 9 wherein the processor is adapted so that corresponding navigation data, comprising at least one of a taxi route segment heading, a taxi route segment length, a distance to an end of the taxi route segment, a time remaining until an end of the taxi route segment is reached, or a speed limit, is automatically displayed adjacent to each of the respective first and second taxi route segments.

16. The system of claim 9 wherein the processor further provides at least one navigation instruction which instructs the user as to what action to take during or at an end of at least one of the taxi route segments.

* * * * *